United States Patent
Kang et al.

(10) Patent No.: US 10,074,166 B2
(45) Date of Patent: Sep. 11, 2018

(54) SYSTEMS AND METHODS FOR INSPECTING CARGOES

(71) Applicants: Tsinghua University, Haidian District, Beijing (CN); Nuctech Company Limited, Haidian District, Beijing (CN)

(72) Inventors: Kejun Kang, Beijing (CN); Zhiqiang Chen, Beijing (CN); Li Zhang, Beijing (CN); Ziran Zhao, Beijing (CN); Yaohong Liu, Beijing (CN); Jian Zhang, Beijing (CN); Jianping Gu, Beijing (CN); Qiang Li, Beijing (CN); Duokun Zhang, Beijing (CN)

(73) Assignees: Tsinghua University, Haidian District, Beijing (CN); Nuctech Company Limited, Haidian District, Beijing (CN)

( * ) Notice: Subject to any disclaimer, the term of this patent is extended or adjusted under 35 U.S.C. 154(b) by 224 days.

(21) Appl. No.: 14/700,249

(22) Filed: Apr. 30, 2015

(65) Prior Publication Data
US 2016/0189360 A1  Jun. 30, 2016

(30) Foreign Application Priority Data
Dec. 30, 2014 (CN) .......................... 2014 1 0842364

(51) Int. Cl.
| | |
|---|---|
| *G06T 7/00* | (2017.01) |
| *G01N 23/10* | (2018.01) |
| *G01V 5/00* | (2006.01) |
| *G01N 23/04* | (2018.01) |
| *G06K 9/46* | (2006.01) |

(Continued)

(52) U.S. Cl.
CPC .......... *G06T 7/0004* (2013.01); *G01N 23/04* (2013.01); *G01V 5/0016* (2013.01); *G06K 9/4604* (2013.01); *G06K 9/4642* (2013.01); *G06K 9/52* (2013.01); *G06K 9/6215* (2013.01); *G06K 9/6256* (2013.01); *G06K 2009/4666* (2013.01)

(58) Field of Classification Search
CPC .... G06T 7/004; G06K 9/4604-9/4614; G01V 5/0016; G01N 23/04
See application file for complete search history.

(56) References Cited

U.S. PATENT DOCUMENTS

| | | | |
|---|---|---|---|
| 7,596,275 B1 * | 9/2009 | Richardson .......... | G01V 5/0016 250/358.1 |
| 2008/0025825 A1 * | 1/2008 | Fujiwara .............. | B65G 63/004 414/279 |

(Continued)

FOREIGN PATENT DOCUMENTS

JP  2007-140729 A  *  6/2007  ............... G06T 7/60

*Primary Examiner* — Wyatt Stoffa
*Assistant Examiner* — Eliza Osenbaugh-Stewar
(74) *Attorney, Agent, or Firm* — Merchant & Gould P.C.

(57) ABSTRACT

The present disclosure discloses a method and system for inspecting cargoes. The method comprises: acquiring a transmission image of the inspected cargoes; processing the transmission image to acquire an interested region; extracting features from the interested region, and determining cargo information of the inspected cargoes according to the extracted features; and providing a proposed treatment suggestion of the cargoes based on the determined cargo information and at least a part of information in a manifest. The above solution can facilitate an image judgment person to accurately judge whether the concerned cargoes are allowed to pass.

12 Claims, 4 Drawing Sheets

(51) Int. Cl.
G06K 9/52 (2006.01)
G06K 9/62 (2006.01)

(56) References Cited

U.S. PATENT DOCUMENTS

2008/0208828 A1* 8/2008 Boiman ............. G06K 9/00342
2013/0101172 A1* 4/2013 Parikh .................. G06T 7/0004
382/104

* cited by examiner

SYSTEMS AND METHODS FOR INSPECTING CARGOES

This application claims benefit of Serial No. 201410842364.4, filed 30 Dec. 2014 in China and which application is incorporated herein by reference. A claim of priority is made to each of the above disclosed applications.

TECHNICAL FIELD

The embodiments of the present disclosure relate to inspection of cargoes, and in particular, to inspection of cargoes based on a radiation image of the cargoes.

BACKGROUND

Currently, in the field of radiation security inspection, the analysis of an X-ray image is merely performed by dual-energy material recognition, wire resolution, penetration test or the like. These approaches often provide the security staff with understanding of the lowest level of cargoes, such as composition of the material of the cargoes, shape of the cargoes or the like. However, such problems as "whether the cargoes comply with the clearance of cargoes," "where is the region liable to secrete collection," "whether it is abnormal to transport the cargoes by the company to that country in this period of time," "what is the small pile of cargoes set aside," or the like cannot be answered. At present, these problems can only be answered depending on rich experience of the security staff and closer scrutiny of content of the image by the security staff. With the increase of the throughput of the customs, it is an inevitable trend to find an intelligent solution.

SUMMARY

In view of one or more problems in the related art, method and systems for inspecting cargoes are provided, which can implement intelligent deduction and provide a treatment suggestion.

In an aspect of the present disclosure, a method for inspecting cargoes is provided, the method comprising: acquiring a transmission image of the inspected cargoes; processing the transmission image to acquire an interested region; extracting features from the interested region, and determining cargo information of the inspected cargoes according to the extracted features; and providing a proposed treatment suggestion of the cargoes based on the determined cargo information and at least a part of information in a manifest.

Preferably, the cargo information is a stack mode of the cargoes, and the step of extracting features from the interested region comprises: extracting description information of the stack mode of the inspected cargoes from the interested region; wherein, a probability of the stack mode of the cargoes in the interested region of the transmission image is determined based on the description information.

Preferably, the step of extracting description information of the stack mode of the inspected cargoes from the interested region comprises: partitioning the interested region and extracting edges from the image of the region; extracting textual features in effective positions of the extracted edges; and finding elements nearest to the textual features from a dictionary, to obtain histogram description features of the region, wherein the dictionary is established based on training image samples.

Preferably, the dictionary is established by sampling each sampling image at regular intervals, and extracting a texture feature in each position; and forming the dictionary by aggregating the textual features extracted in all positions, to acquire feature description of multiple aggregation centers.

Preferably, the interested region is determined by extracting a cargo region of the inspected cargoes and removing regions without cargoes according to a threshold.

Preferably, the step of providing a proposed treatment suggestion of the cargoes based on the determined cargo information and at least a part of information in a manifest comprises: determining a consistency probability by multiplying the probability of a type of cargoes determined based on a real stack mode from the manifest and the conditional probability of the real stack mode based on a predicted one from the transmission image, and in a case that the consistency probability is lower than a predetermined value, judging that the cargoes are inconsistent with the cargoes in the manifest.

Preferably, the cargo information is the type of cargoes, and the step of extracting features from the interested region comprises: extracting description information of the type of cargoes of the inspected cargoes from the interested region; wherein the probability of the type of cargoes of the cargoes in the interested region of the transmission image is determined based on the description information; and a value of the probability that the cargoes are consistent with the type of cargoes in the manifest is acquired using the probability in combination with an import and export company, import and export time, and import and export countries.

Preferably, the probability of the type of cargoes is determined according to an atomic number and an electron density.

Preferably, the step of providing a proposed treatment suggestion of the cargoes based on the determined cargo information and at least a part of information in a manifest comprises: establishing a cost model by comparing a tax of a predicted type of cargoes and a tax of the type of cargoes in the manifest and analyzing a level of import and export regulation, to provide the proposed treatment suggestion of the cargoes.

Preferably, the method further comprises: acquiring a list of cargoes similar to the inspected cargoes using an image content retrieval engine; establishing distribution relationship description according to the import and export company, the import and export countries, and the import and export time related to the list of cargoes; and determining whether the cargoes belong to normal cargoes based on the established distribution relationship description.

Preferably, the retrieved list of images of similar cargoes is classified according to the type of cargoes, and probabilities of import and export of the same type of cargoes in different countries by different companies in different periods of time are calculated.

Preferably, conditions of import and export of similar cargoes in different periods of time are displayed by establishing a time axis.

Preferably, in each period of time, different import and export country pairs are displayed through different graphs, and probability distributions of similar cargoes by different import and export companies are displayed.

Preferably, the method further comprises: prompting to a user a cargo region which deviates from a main body stack mode, a small cargo region for which a type of cargoes cannot be predicted, or a local region of which a texture is significantly different from the global texture.

Preferably, the method further comprises: determining a type of cargoes which are placed individually in a small pile and cannot involve in global information deduction using an interactive deduction manner.

Preferably, the method further comprises: deducing a cargo type distribution which can present such textures, an average atomic number, and a position in the container according to the texture information of the local region.

Preferably, the method further comprises: extracting texture features in a specified region; acquiring a list of texture blocks with similarities larger than a predetermined value based on image content retrieval; and establishing the cargo type distribution which presents such textures by determining cargo type information of the list of texture blocks.

Preferably, the average atomic number of the inspected cargoes is acquired by using a dual-energy material recognition algorithm.

Preferably, an actual position of the specified region in the container is acquired according to the scaling of the image and a pixel position of the specified region.

In an another aspect of the present disclosure, a system for inspecting cargoes is provided, the system comprising: a radiation imaging system configured to scan the inspected cargoes to acquire a transmission image of the inspected cargoes; and a data processing apparatus configured to process the transmission image to acquire an interested image, extract features from the interested region, determine cargo information of the inspected cargoes according to the extracted features, and provide a proposed treatment suggestion of the cargoes based on the determined cargo information and at least a part of information in a manifest.

With the above solution, different deduction conclusions and corresponding treatment suggestions can be provided by analyzing the content of the X ray image and the data of the manifest, which facilitates an image judgment person to improve the efficiency and the accuracy.

BRIEF DESCRIPTION OF THE DRAWINGS

For better understanding the present disclosure, the embodiments of the present disclosure will be described according to the accompanying drawings below.

The accompanying drawings do not illustrate all circuits or structures of the embodiments. The same reference numerals refer to the same or similar parts or features throughout the accompanying drawings.

DETAILED DESCRIPTION

The particular embodiments of the present disclosure are described below in detail. It should be noted that the embodiments herein are used for illustration only, without limiting the present disclosure. In the description below, a number of particular details are explained to provide better understanding of the present disclosure. However, it is apparent to those skilled in the art that the present disclosure can be implemented without these particular details. In other instances, well known circuits, materials or methods are not described so as not to obscure the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred at various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the accompanying drawings provided herein are used for the purpose of illustration, and are not drawn to scale. The term "and/or" used herein means any and all combinations of one or more listed items.

The intelligent analysis and deduction system based on an X-ray image of cargoes and data of a manifest is an intelligent analysis and deduction solution which can automatically analyze a type of the cargoes, automatically provide a region liable to secrete collection, automatically deduce composition of mixed cargoes, automatically judge an abnormal transportation behavior, and provide a proposed treatment suggestion according to the risk level. For example, the following difficult problems faced by the customs can be effectively solved, such as, "whether the transported cargoes comply with the type of the clearance of cargoes," "how to rapidly guide the security staff to locate the position liable to secrete collection," "what is the possible composition of the mixed cargoes," "whether the import and export behavior is abnormal," or the like. The system will hierarchically provide different conclusions and corresponding treatment suggestions by analyzing the content of the X-ray image and the data of the manifest.

For the problems in the related art, the present disclosure proposes to process a transmission image of inspected cargoes to acquire an interested region after acquiring the transmission image, then extract the features from the interested region, determine cargo information of the inspected cargoes according to the extracted features, and then provide a proposed treatment suggestion of the cargoes based on the determined cargo information and at least a part of information in the manifest.

Figure 1A:
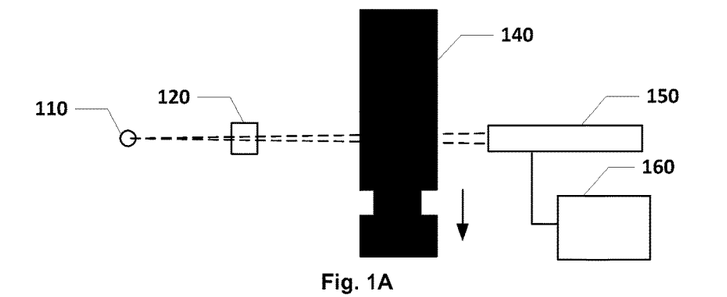
FIGS. 1A and 1B illustrate structural diagrams of a system for inspecting cargoes according to an embodiment of the present disclosure.
Figure 1B:
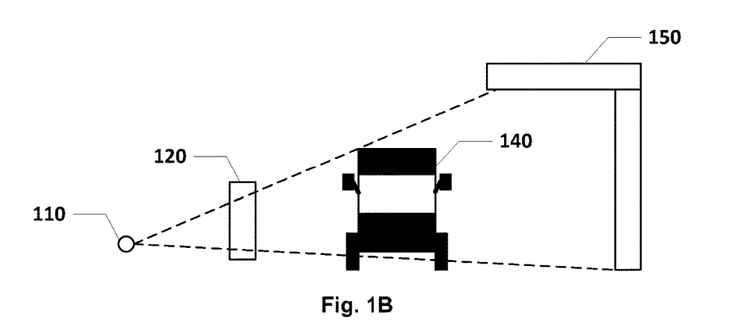

FIGS. 1A and 1B are structural diagrams of an inspection system according to an embodiment of the present disclosure. FIG. 1A illustrates a top view of the inspection system, and FIG. 1B illustrates a front view of the inspection system. As shown in FIGS. 1A and 1B, an X ray is generated by a ray source 110, and is used for security inspection of a moving container truck 140 after being collimated by a collimator 120. A ray which is transmitted through the truck is received by a detector 150, and a transmission image is acquired by a data processing apparatus 160 such as a computer or the like.

According to the embodiment of the present disclosure, after the scanned transmission image of the container truck 140 is acquired, the transmission image is processed by the data processing apparatus 160 to acquire an interested region, for example, a main body cargo region, then features are extracted from the interested region, cargo information of the inspected cargoes is determined according to the extracted features, and then a proposed treatment suggestion of the cargoes is provided based on the determined cargo information and at least a part of information in the manifest.

Figure 2:
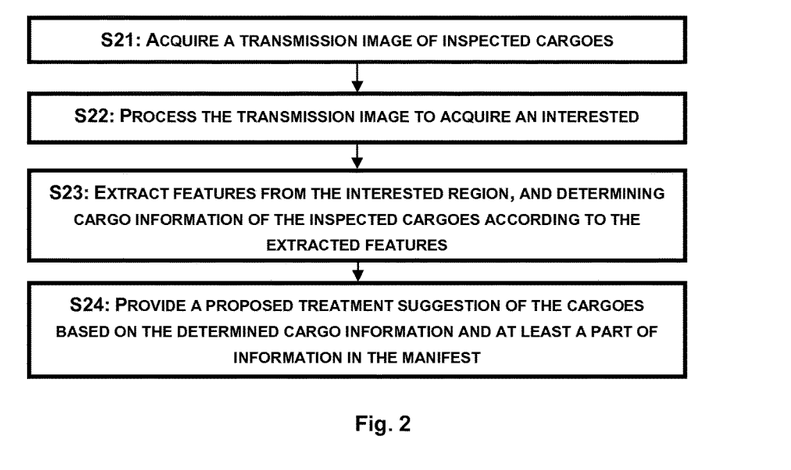
FIG. 2 is a schematic flowchart of a method for inspecting cargoes according to an embodiment of the present disclosure.

FIG. 2 is a flowchart of an inspection method according to an embodiment of the present disclosure. As shown in FIG. 2, in step S21, a transmission image of inspected cargoes is acquired by a transmission scanning system. For example, when an inspected container truck passes through a detection region at a certain speed, a transmission image may be generated. Resolutions of the acquired images are slightly different due to different energy/dosages of ray sources of scanning devices, sizes of detectors, mechanical structures, speeds of motor vehicles, and beam-out frequencies. In some embodiments, the transmission image is firstly normalized as needed, i.e., the brightness is normalized and the resolution is uniformly scaled to 5*5 (mm/pixel) for example.

In step S22, the transmission image is processed to acquire an interested region. The main body cargo region may be acquired in the pre-processing process. For example, a container region in the transmission image is firstly extracted, and then the main body cargo region is extracted, for example, by excluding a peripheral region of the main body cargoes, for purpose of interference avoidance and reduction of ineffective computational complexity.

In addition, in some embodiments, influences of an air region and an impenetrable region in the image may also be removed. In the embodiment of the present disclosure, the air region and the impenetrable region in the transmission image are directly detected by using a threshold method. When the cargoes are detected, the influences of the air region and the impenetrable region can be avoided, which can not only accelerate the detection speed, but also can reduce misinformation.

In step S23, features are extracted from the interested region, and cargo information of the inspected cargoes is determined according to the extracted features. According to different embodiments, the cargo information herein may be a stack mode of the cargoes (which is represented by a probability for example) or a type of the cargoes (for example, a probability of belonging to a certain type of cargoes) or the like. In other embodiments, the type of the cargoes may be determined according to an atomic number and/or an electron density and/or a mass thickness or the like.

In step S24, a proposed treatment suggestion of the cargoes is provided based on the determined cargo information and at least a part of information in the manifest. For example, the proposed suggestion is provided by combining the cargo information acquired based on image processing with cargo information acquired from the manifest. If the cargo information is not consistent, the cargoes are not allowed to pass, or are treated hierarchically in accordance with the consistency probability.

In the embodiment of the present disclosure, the cargo inspection system may comprise (1) global information deduction, (2) local information deduction, and (3) active learning. The global information deduction system primarily comprises cargo stack mode deduction, cargo type deduction, hierarchical mixed cargo deduction, and abnormal event deduction.

The cargo stack mode deduction is to predict a cargo stack mode by analyzing the X-ray image of the cargoes, so as to deduce a probability that the predicted cargo stack mode is consistent with the type of clearance of cargoes (from the data of the manifest), and provide a proposed treatment suggestion.

Figure 3:
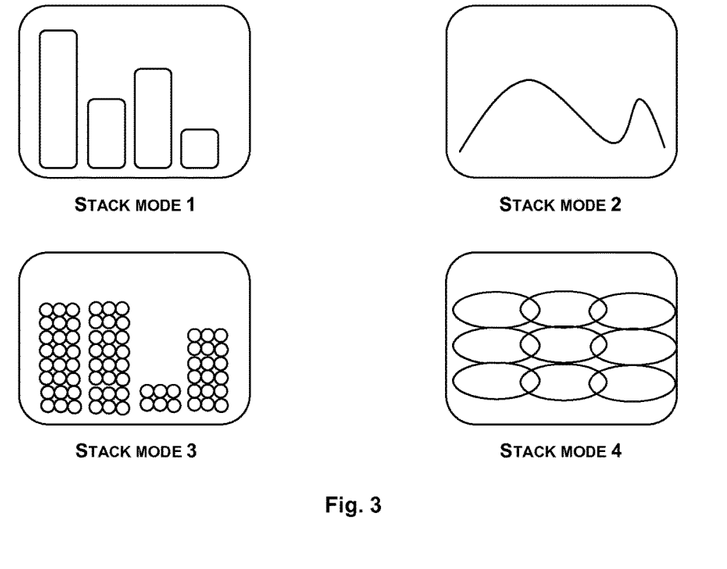
FIG. 3 is a diagram of four stack modes involved in a solution according to an embodiment of the present disclosure.

The type of the cargoes is specified by an HSCODE code of the customs. The cargoes are stacked in the container in a general rule, and the stack mode may primarily be divided into four common stack modes, as shown in FIG. 3. In a general case, different types of cargoes generally correspond to different stack modes. For example, paper pulp cargoes are generally in a first stack mode, cereal cargoes are generally in a second stack mode, wine cargoes are generally in a third stack mode, and motorcycle cargoes are generally in a fourth stack mode. The prediction of the current stack mode of the cargoes may be provided by using the image analysis technology. The current type of the clearance of the cargoes may be provided by retrieving information from the manifest, to acquire the normal stack mode of the type of cargoes. In combination of the two aspects of information, the probability that the current cargoes are consistent with the type of the clearance of cargoes (from the data of the manifest) may be deduced. The proposed treatment suggestion is provided according to the consistency degree of the stack modes of the cargoes.

Figure 6:
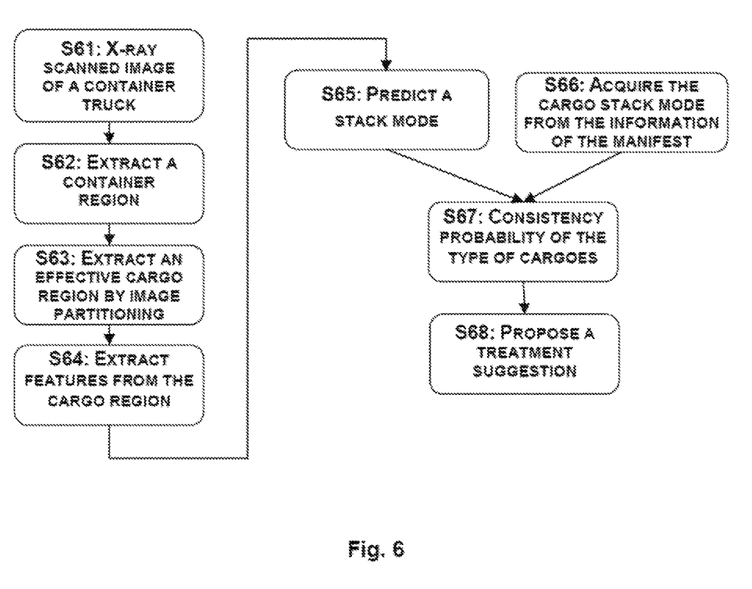
FIG. 6 is a flowchart of stack mode prediction and treatment suggestion proposition according to an embodiment of the present disclosure.

FIG. 6 illustrates a flowchart of cargo stack mode prediction and treatment suggestion proposition. In steps S61, S62, and S63, a scanned image is acquired, a container region is extracted from the scanned image of the container truck, and then a cargo region is extracted by a partitioning algorithm. Preferably, the Statistical Region Merge (SRM) algorithm is used as the partitioning algorithm. The partitioned regions are further processed, to remove regions without cargoes by using a threshold limit method, and remove regions of which an area is no more than ⅓ of an area of the whole container. The remaining region is considered as the main body cargo region.

In step S64, features are extracted from an image of the main body cargo region. Preferably, the Texton+Bag of Words (BOW) method is used here, but it is not limited to this combination. For example, description information of a stack mode of inspected cargoes is extracted from the interested region, and a probability of the stack mode of the cargoes in the interested region of the transmission image is determined based on the description information.

Preferably, the step of extracting the description information of the stack mode of the inspected cargoes from the interested region comprises: partitioning the interested region and extracting edges from the image of the region; extracting textual features in effective positions of the extracted edges; finding elements nearest to the textual features from a dictionary, to acquire description features of histograms of the regions, wherein the dictionary is established based on training image samples. Preferably, the dictionary is established by sampling each sample image at regular intervals, and extracting a texture feature in each position; and forming the dictionary by aggregating the extracted textual features of all positions, to acquire feature description of multiple aggregation centers.

In step S65, the Support Vector Machine (SVM) classification model is finally introduced for classification and the predicted stack mode is acquired.

In steps S66, S67 and S68, the type of the clearance of cargoes may be acquired by retrieving information from the manifest. For example, the consistency probability is determined by multiplying the probability of the type of the cargoes in the stack mode determined based on the manifest with the probability of the stack mode determined based on the transmission image, and when the consistency probability is lower than a predetermined value, it is judged that the cargoes are inconsistent with the cargoes in the manifest. The consistency probability of the type of the cargoes is calculated using the following probability equation:

$$p(\text{Cargo}|\text{Stack Mode}_{predict}) = p(\text{Cargo}|\text{Stack Mode}_{manifest})p(\text{Stack Mode}_{manifest}|\text{Stack Mode}_{predict})$$

wherein, $p(\text{Cargo}|\text{StackMode}_{manifest})$ represents the probability of the type of cargoes determined based on the real cargo stack mode from the manifest, and $p(\text{Stack Mode}_{manifest}|\text{Stack Mode}_{predict})$ represents the conditional probability of the real stack mode based on the predicted one from the transmission image.

In addition, the proposed treatment suggestion may be divided into four levels, i.e., the cargoes can pass, the cargoes seem a little different, the cargoes seem required to be inspected carefully, the cargoes need to be inspected carefully.

The cargo type deduction is to predict a possible type of the cargoes by analyzing the content of the X-ray image of the cargoes, recognition information of a dual-energy material, and data of the manifest, so as to deduce the probability that the possible type is consistent with the type of the clearance of cargoes (from the data of the manifest), and provide a risk level and a proposed treatment suggestion. The type of the cargoes is specified by an HSCODE code of the customs. The type of the cargoes needs to be predicted by modeling the content information of the image, the recognition information of the dual-energy material and the data of the manifest, such as import and export company, import and export countries, import and export time or the like, to complete combined deduction. The probability that the predicted type of cargoes is consistent with the type of cargoes in the manifest is finally provided according to a deduction result. A cost model is established by analyzing the difference between the tax of the predicted type of cargoes and the tax of the type of the clearance of cargoes (from the data of the manifest) and the export regulation level, to provide the risk level and provide the proposed treatment solution based thereon.

Figure 7:
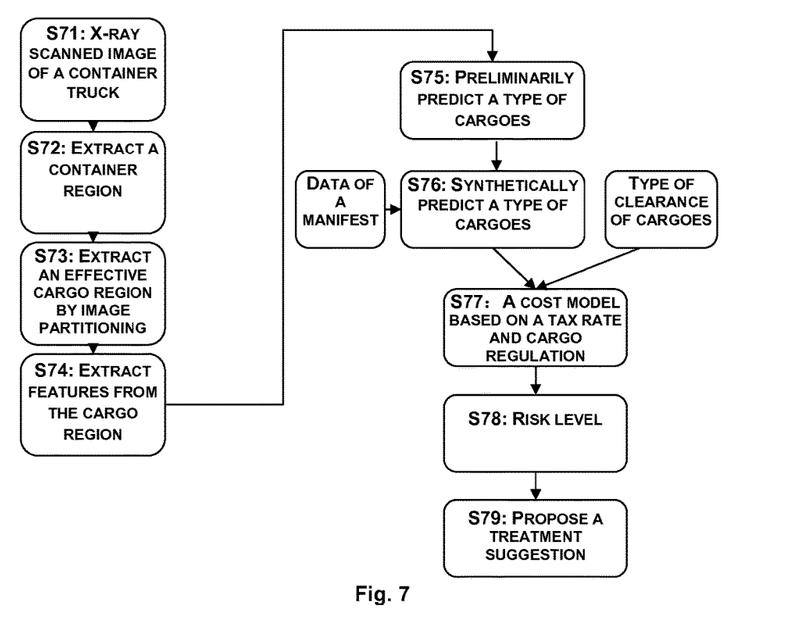
FIG. 7 is a flowchart of cargo type prediction, risk level estimation, and treatment suggestion proposition according to an embodiment of the present disclosure.

FIG. 7 is a flowchart of cargo type prediction, risk level estimation, and treatment suggestion proposition according to an embodiment of the present disclosure. In steps S71, S72 and S73, a container region is extracted from the scanned image of the container truck, and then a cargo region is extracted by using a partitioning algorithm. Preferably, the SRM algorithm is used as the partitioning algorithm. The partitioned regions are further processed, to remove regions without cargoes by using a threshold limit method, and remove regions of which an area is no more than ⅓ of an area of the whole container. Then, the remaining region is considered as the main body cargo region.

In step S74, features are extracted from an image of the main body cargo region. Preferably, the Texton+BOW method is used here, but it is not limited to the combination. Preferably, in step S75, the SVM classification model is introduced for classification, and a preliminary predicted type of cargoes is acquired. In step S76, the probability model is used in conjunction with the information of the manifest, which comprises import and export company, import and export time, and import and export countries.

The probability equation is as follows:

$$P(\text{Cargo} | \text{Info}) \approx \frac{1}{Z} * p(\text{Cargo} | \text{Image}) * p(\text{Country} | \text{Cargo}) * p(\text{Company} | \text{Cargo}) * p(\text{Time} | \text{Cargo})$$

wherein, Z is a normalization constant, p(Cargo|Image) represents the probability of the type of cargoes determined based on the image information, p(Country|Cargo) represents the probability of importing and exporting to the target country with this kind of cargo, p(Company|Cargo) represents the probability of importing and exporting this cargo by the target company, and p(Time|Cargo) represents the probability of importing and exporting this cargo category in this period.

In step S77, a cost value is calculated by using the following cost model based on the tax and the cargo regulation, and then in step S78, the risk level is determined according to the cost value:

$$\text{Cost} = \frac{1}{\exp(-\alpha|T_m - T_p|) * \exp(-\beta C_p)}$$

wherein, $T_m$ is the tax rate needed to be collected for the type of cargoes in the manifest; $T_p$ is the tax rate needed to be collected for the predicted type of cargoes; $C_p$ reflects whether the predicted type of cargoes is the cargoes to be regulated, and if so, $C_p$ is 1, otherwise, $C_p$ is 0; α, β are parameters used for controlling the influence degree of the tax rate and the regulation on the cost model. In step S79, the proposed treatment suggestion may be divided into four levels, i.e., the cargoes can pass, the cargoes seem a little different, the cargoes seem required to be inspected carefully, the cargoes need to be inspected carefully.

Figure 4:
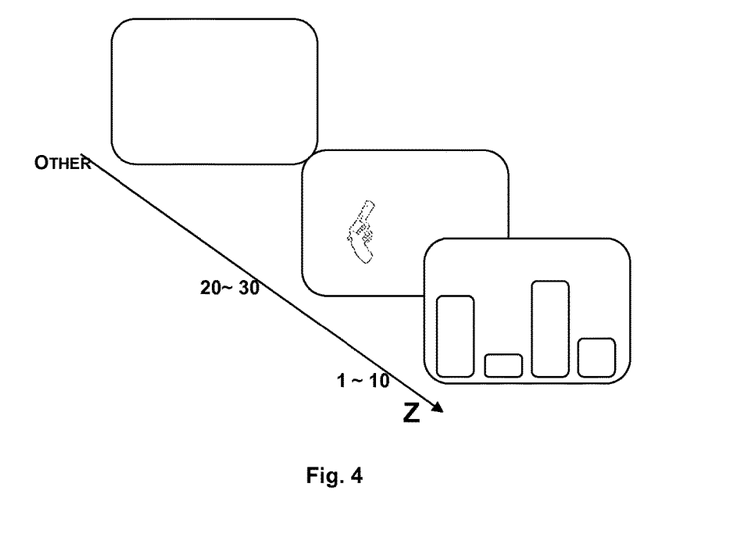
FIG. 4 is a diagram of hierarchical mixture deduction in a solution according to an embodiment of the present disclosure.

The hierarchical mixed cargo deduction is to deduce the composition of the mixed cargoes by using a physical and mathematical model. The diagram of hierarchical deduction is shown in FIG. 4. Preferably, a layer is constructed every 10 atomic numbers, and matters in this segment are displayed. An X ray with an energy spectrum distribution is equivalently considered as a single-energy X ray with a certain energy. Thereby, the whole physical process is simplified as a process of a certain equivalent single-energy X ray passing though the mixed matters. The relationship between the intensity of the input ray and the intensity of the output ray is derived by establishing an attenuation rule equation of the single-energy X ray passing through the mixed matters. The mass attenuation coefficients of matters with different atomic numbers in the unknown equivalent single-energy X-ray are solved by using a supervised learning method. When the mixed matters are deduced in practice, the sparse solution of the mass thickness may be calculated by using a sparse method, so as to deduce the composition of the mixture.

For the X ray with an energy distribution which is generated by an accelerator, the attenuation rule of the X ray passing through the matters is as follows:

$$I = \int_0^E I_{E'} e^{-\mu(E',Z) t_m(z)} dE'$$

wherein, $I_{E'}$ is a dosage of the X ray when the energy is E'; I is a total dosage of the X ray after the X ray passes through the matters; $\mu(E',Z)$ is the mass attenuation coefficient, which is related to the atomic numbers of the matters and the energy of the X ray; and $t_m$ is the mass thickness, which is related to the atomic numbers of the matters.

$\mu_{eff}(Z)$ is used for representing the mass attenuation coefficient in the X ray with a specified energy spectrum distribution, which is only related to the atomic numbers of the matters, and is defined as an equivalent mass attenuation coefficient. Thereby, the above equation may be written as:

$$I = I_0 e^{-\mu_{eff}(Z) t_m(Z)}$$

wherein, $I_0$ represents an output dosage of the X ray, I represents a dosage of the X ray after the X ray passes through the matters, $\mu_{eff}(Z)$ represents the equivalent mass attenuation coefficient, and $t_m(Z)$ represents the mass thickness.

For the mixture, the above equation may be written as:

$$I = I_0 e^{-\Sigma_k \mu_{eff}(Z_k) t_m(Z_k)}$$

The transparence ln T is calculated as follows:

$$\ln T = \ln \frac{I_0}{I} = \sum_k \mu_{eff}(Z_k) t_m(Z_k)$$

For a dual-energy system, there are high-energy and low-energy X ray energy spectrums, and therefore, the following equation holds:

$$\begin{pmatrix} \ln T_{low} \\ \ln T_{high} \end{pmatrix} = \begin{pmatrix} \mu_{eff_{low}}(Z_0) & \cdots & \mu_{eff_{low}}(Z_n) \\ \mu_{eff_{high}}(Z_0) & \cdots & \mu_{eff_{high}}(Z_n) \end{pmatrix} \begin{pmatrix} t_m(Z_0) \\ \vdots \\ t_m(Z_n) \end{pmatrix}$$

The above equation is simplified as the following matrix expression form:

$$Y = MX$$

wherein, $$M = \begin{pmatrix} \mu_{eff_{low}}(Z_0) & \cdots & \mu_{eff_{low}}(Z_n) \\ \mu_{eff_{high}}(Z_0) & \cdots & \mu_{eff_{high}}(Z_n) \end{pmatrix},$$

$$X = \begin{pmatrix} t_m(Z_0) \\ \vdots \\ t_m(Z_n) \end{pmatrix},$$

$$Y = \begin{pmatrix} \ln T_{low} \\ \ln T_{high} \end{pmatrix}$$

As the equivalent mass attenuation coefficients for different energy spectrums are not a specific constant, the equivalent mass attenuation coefficients cannot be derived by experiments. Preferably, in the present patent, supervised sparse dictionary learning algorithm is used, but it is not limited thereto. The specific algorithm is as follows:

1) performing dictionary learning, to establish the following optimization function:

$$\min_M \sum_l^N \|Y_l - MX_l\|_2^2$$

2) performing dictionary learning based on a training sample pair $\{X, Y\}$, to obtain a matrix M.

3) deducing the composition of the mixture, to establish the following optimization function:

$$\min_X \|Y - MX\|_2^2, s.t. \|X\|_0 \leq L$$

4) minimizing the above function to obtain a sparse solution X, wherein non-zero terms represent possible compositions.

The mixture may be displayed hierarchically based on the mixture composition deduction algorithm as described above.

The abnormal event deduction is an abnormal event deduction solution based on the content information of the image of the cargoes, import and export company, import and export countries, and import and export time information. In a general case, different import and export companies operate different import and export cargoes, different countries prefer to import and export particular types of cargoes, and the similar types of cargoes are generally imported and exported intensively within a certain time. The deduction process is to acquire a list of cargoes similar to the currently scanned cargoes by an image content retrieval engine, and establish a distribution relationship diagram according to the import and export company, import and export countries, and import and export time corresponding to the cargoes (with reference to FIG. 5). Based on the established distribution diagram and the data of the manifest, whether current import and export of the type of cargoes belongs to a normal behavior can be intuitively provided.

Figure 8:
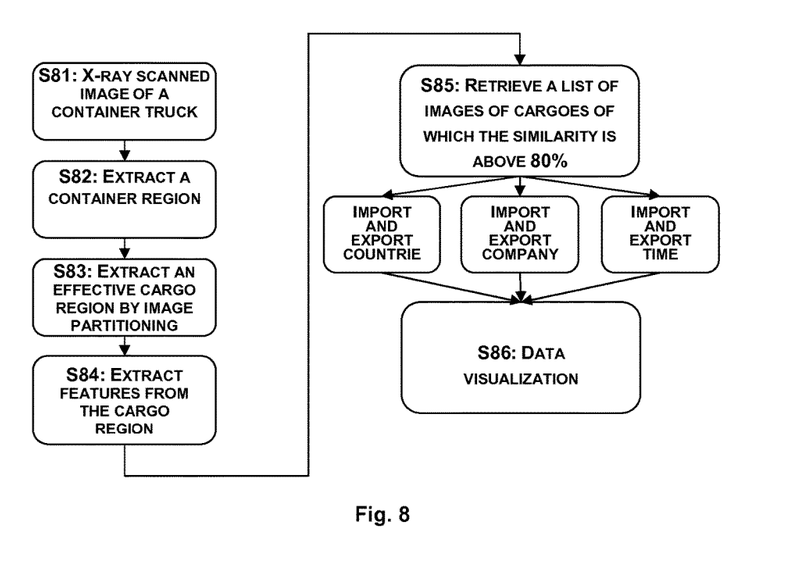
FIG. 8 is a flowchart of similar cargo distribution deduction according to an embodiment of the present disclosure.

FIG. 8 is a flowchart of similar cargo distribution deduction according to an embodiment of the present disclosure. The process of the image of the cargoes at the front end is basically the same as that in the cargo stack mode deduction. Therefore, steps 81, S82 and S84 are the same as S61, S62 and S64 described with reference to FIG. 6 above, and will not be described in detail here.

Figure 5:
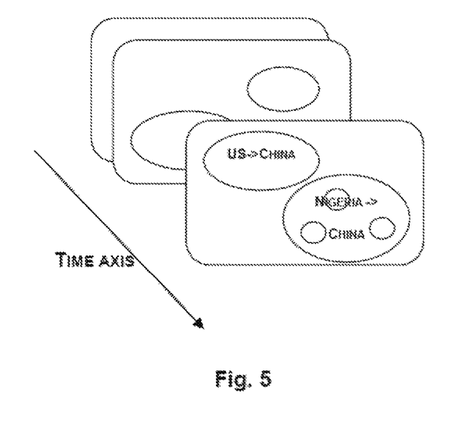
FIG. 5 is a visual diagram of abnormal event deduction in a solution according to an embodiment of the present disclosure.

In step S85, after the feature description of the image of the cargoes is acquired, a list of images of cargoes of which the similarity is above 80% is acquired by the retrieval module based on the content of the images. According to the images in the list, data such as import and export countries, import and export company, and import and export time is extracted from the corresponding data of the manifest. According to the type of the cargoes, the retrieved list of images of similar cargoes is classified, and the probabilities of import and export of the same type of cargoes in different counties by different companies in different periods of time are calculated. Preferably, in step S86, the visual solution in FIG. 5 is used. The conditions of import and export of similar cargoes within different periods of time are displayed by establishing a time axis. In each time segment, different import and export country pairs are displayed by different ellipses, and in these ellipses, probability distributions of import and export of similar cargoes by different import and export companies are displayed by different ellipses. According to the import and export counties, import and export company, and import and export time of the currently scanned cargoes, and the type of the clearance of cargoes, it can be intuitively deduced whether import/export of the type of cargoes from/to the specified country by the current company belongs to a normal event.

The local information deduction system primarily comprises important region guidance, single pile of cargoes deduction, and user-specified local region information deduction.

The important region guidance is primarily responsible for guiding a user to pay attention to a specific region in the X-ray image of the cargoes. The specific region primarily comprises (1) a cargo region which deviates from the main body stack mode, (2) a small cargo region for which the type of cargoes cannot be predicted, and (3) a local region of which a texture is significantly different from the global texture. In these specific regions, prohibited cargoes may often be carried secretly. The extraction of the specific regions (1) and (2) can be indirectly provided by image partition and region recognition. A region of which the stack mode or type of cargoes cannot be recognized and the area is in a specified range can be considered as a specific region. For the extraction of the specific region (3), a texture similarity calculation model is established based on a supervised learning method, and the specific region is detected according to a significance detection method.

The important region is divided into three types, i.e., a region which deviates from the main body stack mode, a small region for which the type of cargoes cannot be predicted, and a local region of which a texture is significantly different from the global texture. The first and second types of important regions may be indirectly provided by cargo stack mode deduction and cargo type deduction. It needs to provide the definition of the texture similarity so as to calculate the third type of important region. Preferably, an understanding space of a person is established by a supervised learning manner, so as to establish the definition of the similarities of the texture blocks, but it is not limited thereto.

The step of establishing an understanding space of a person comprises the following steps.

In a first step, different texture blocks are collected from images of training cargoes.

In a second step, similarities of the texture blocks are compared according to subjective judgment of the person.

In a third step, features are extracted from the texture blocks.

In a fourth step, a texture similarity comparison model is established by using the Stochastic triplet embedding algorithm, i.e., constructing the understanding space.

After the texture similarity model is established, the extraction of the third type of important region can be completed by using a general significance detection method.

The single pile of cargoes deduction is primarily responsible for processing cargoes which are placed individually in a small pile and cannot involve in global information deduction and deducing a corresponding type of the cargoes. The interactive deduction method is primarily used, which needs to perform combined deduction by combining the content information of the image and the user interaction information. The combined deduction is implemented by constructing a combined probability model of the type of cargoes and the user interaction response under given information of the image.

The interactive deduction method is used as the single pile of cargoes deduction, and the single pile of cargoes is deduced and recognized according to the content of the image and the user interaction. Preferably, the probability model is constructed as follows:

$$p(z,U|x)=p(U|z,x)p(z|x)$$

wherein, z represent the type of cargoes, U represents user interaction response, and x represents content of the image.

$p(z|x)$ may be acquired by a general image recognition algorithm, and $p(U|z,x)$ needs to be acquired by user interaction response.

The introduction of the interactive information can effectively improve the accuracy of the model established only based on the content of the image. It is important to decide what interaction information to select. It needs to complement the information acquired by directly analyzing the content of the image using an algorithm as much as possible, thereby introducing more effective information to falicitate recognition.

Preferably, the selection of the interactive information here is to select a texture block which is most representative of the single pile of cargoes, and select cargoes similar to the image of the single pile of cargoes from a list of candidates.

The user-specified local region information deduction is primarily responsible for presenting the cargo type distribution with the texture, an average atomic number, and a position in the container according to the texture information of the local region. The cargo type distribution is primarily deduced by using an image retrieval technology based on textures. The average atomic number is primarily deduced by a dual-energy X ray material recognition algorithm. The position in the container needs to be deduced and determined by the position of the region in the image and the scaling of the image.

For example, the implementation steps are as follows. In a first step, texture features of a specified region are extracted, preferably, by using Fisher Vector. In a second step, a list of texture blocks of which the similarity is above 80% is acquired based on image content retrieval. In a third step, a cargo type distribution diagram which can present such textures may be established by using the retrieved list of texture blocks to acquire corresponding cargo type information thereof. In a fourth step, the average atomic number is acquired by a dual-energy material recognition algorithm. In a fifth step, the coordinate position of the specified region in the container is acquired according to the scaling of the image and the pixel position of the specified region.

An active learning system is responsible for actively discovering image samples which are difficult to be recognized based on the current model, providing a user with the image samples to mark the samples, and finally performing online update of the model. The active learning model provides real-time services to the global system deduction and local system deduction. The active learning system is an underlying aid system, and is primarily responsible for cargo stack model deduction and cargo type deduction model services. The active discovering is based on the samples which are difficult to be recognized based on the current model, and performs online update of the model.

The foregoing detailed description has set forth various embodiments of the inspection method and system via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, Modifications and alternatives falling within the scope of the claims and equivalents thereof are to be encompassed by the scope of the present disclosure which is defined by the claims as attached.

We claim:

1. A method for inspecting cargoes, comprising:
   subjecting inspected cargoes to a radiation;
   acquiring a transmission image of the inspected cargoes from transmitted rays of the radiation;
   processing the transmission image to acquire an interested region;
   extracting features from the interested region, and determining cargo information of the inspected cargoes according to the extracted features; and
   providing a proposed treatment suggestion of the cargoes based on the determined cargo information and at least a part of information in a manifest,
   wherein the cargo information is spatial arrangement of the cargoes, and
   the step of extracting features from the interested region comprises extracting description information of the spatial arrangement of the inspected cargoes from the interested region; and
   the step of providing a proposed treatment suggestion of the cargoes based on the determined cargo information and at least a part of information in a manifest comprises: determining a consistency probability by multiplying the probability of a type of cargoes determined based on real spatial arrangement from the manifest and the conditional probability of the real spatial arrangement based on a predicted one from the transmission image, and in a case that the consistency probability is lower than a predetermined value, judging that the spatial arrangement of the cargoes are inconsistent with the type of the cargoes in the manifest.

2. The method according to claim 1, wherein the subjecting inspected cargoes to a radiation comprises subjecting the inspected cargoes to an x-ray radiation.

3. The method according to claim 1, wherein the step of extracting description information of the spatial arrangement of the inspected cargoes from the interested region comprises:
   partitioning the interested region and extracting edges from the image of the region;
   extracting textual features in effective positions of the extracted edges; and
   finding elements nearest to the textual features from a dictionary, to obtain histogram description features of the region, wherein the dictionary is established based on training image samples.

4. The method according to claim 3, wherein the dictionary is established by
   sampling each sampling image at regular intervals, and extracting a texture feature in each position; and
   forming the dictionary by aggregating the textual features extracted in all positions, to acquire feature description of multiple aggregation centers.

5. The method according to claim 1, wherein the interested region is determined by extracting a cargo region of the inspected cargoes and removing regions without cargoes according to a threshold.

6. The method according to claim 1, further comprising:
   prompting to a user a cargo region which deviates from a main body spatial arrangement, a small cargo region for which a type of cargoes cannot be predicted, or a local region of which a texture is significantly different from the global texture.

7. The method according to claim 1, further comprising:
   determining a type of cargoes which are placed individually in a small pile and cannot involve in global information deduction using an interactive deduction manner.

8. The method according to claim 1, further comprising:
   deducing a cargo type distribution which can present such textures, an average atomic number, and a position in the container according to texture information of a local region.

9. The method according to claim 8, further comprising:
   extracting texture features in a specified region;
   acquiring a list of texture blocks with similarities larger than a predetermined value based on image content retrieval; and
   establishing the cargo type distribution which presents such textures by determining cargo type information of the list of texture blocks.

10. The method according to claim 9, wherein the average atomic number of the inspected cargoes is acquired by using a dual-energy material recognition algorithm.

11. The method according to claim 9, wherein an actual position of the specified region in the container is acquired according to the scaling of the image and a pixel position of the specified region.

12. A system for inspecting cargoes, comprising:
    a radiation imaging system configured to scan the inspected cargoes to acquire a transmission image of the inspected cargoes; and
    a data processing apparatus configured to process the transmission image to acquire an interested image, extract features from the interested region, determine cargo information of the inspected cargoes according to the extracted features, and provide a proposed treatment suggestion of the cargoes based on the determined cargo information and at least a part of information in a manifest, wherein the cargo information is spatial arrangement of the cargoes, and the data processing apparatus is further configured to extract features from the interested region by extracting description information of the spatial arrangement of the inspected cargoes from the interested region; and the step of providing a proposed treatment suggestion of the cargoes based on the determined cargo information and at least a part of information in a manifest comprises—: determining a consistency probability by multiplying the probability of a type of cargoes determined based on real spatial arrangement from the manifest and the conditional probability of the real spatial arrangement based on a predicted one from the transmission image, and in a case that the consistency probability is lower than a predetermined value, judging that the spatial arrangement of the cargoes are inconsistent with the type of the cargoes in the manifest.

* * * * *